(12) United States Patent
Tang et al.

(10) Patent No.: US 10,930,901 B2
(45) Date of Patent: Feb. 23, 2021

(54) ELECTRIC VEHICLE BATTERY CELL HAVING A PATTERNED SURFACE

(71) Applicant: SF Motors, Inc., Santa Clara, CA (US)

(72) Inventors: Yifan Tang, Santa Clara, CA (US); Chien-Fan Chen, Santa Clara, CA (US); Ying Liu, Santa Clara, CA (US)

(73) Assignee: SF Motors, Inc., Santa Clara, CA (US)

( * ) Notice: Subject to any disclaimer, the term of this patent is extended or adjusted under 35 U.S.C. 154(b) by 154 days.

(21) Appl. No.: 16/153,165

(22) Filed: Oct. 5, 2018

(65) Prior Publication Data

US 2019/0296274 A1    Sep. 26, 2019

Related U.S. Application Data

(60) Provisional application No. 62/646,979, filed on Mar. 23, 2018.

(51) Int. Cl.
*H01M 2/04* (2006.01)
*H01M 2/10* (2006.01)
*H01M 2/08* (2006.01)
*B60L 50/60* (2019.01)

(52) U.S. Cl.
CPC ....... *H01M 2/0439* (2013.01); *H01M 2/0473* (2013.01); *H01M 2/08* (2013.01); *H01M 2/1077* (2013.01); *B60L 50/66* (2019.02); *H01M 2220/20* (2013.01)

(58) Field of Classification Search
CPC ............. H01M 2/0439; H01M 2/1077; H01M 2/0473; H01M 2/08; H01M 2220/20; H01M 2/0408; B60L 50/66; B60L 50/64; B60L 58/26
USPC ........................................................ 429/156
See application file for complete search history.

(56) References Cited

U.S. PATENT DOCUMENTS

2003/0031929 A1 *   2/2003   Kato ................... H01M 10/345
                                                  429/223

* cited by examiner

*Primary Examiner* — Gary D Harris
(74) *Attorney, Agent, or Firm* — Foley & Lardner LLP; James De Vellis (57) ABSTRACT

Provided herein are a battery cell of a battery pack to power electric vehicles. The battery cell can include a housing. The housing can define an inner region. An electrolyte can be disposed in the inner region defined by the housing. The battery cell can include a lid. A gasket can couple the lid with the first end of the housing to seal the battery cell. The gasket can include a first gasket surface and a second gasket surface. The first end of the housing can have a crimped edge disposed about the first gasket surface to couple the gasket with the first end of the housing and position the second gasket surface adjacent to the electrolyte. The crimped edge can have a first crimped surface having a predetermined pattern for wire bonding and a second crimped surface disposed adjacent to the first gasket surface.

20 Claims, 9 Drawing Sheets

ELECTRIC VEHICLE BATTERY CELL HAVING A PATTERNED SURFACE

CROSS REFERENCE TO RELATED APPLICATION

The present application claims the benefit of priority under 35 U.S.C. § 119(e) to U.S. Provisional Application 62/646,979, filed on Mar. 23, 2018, tilted "BATTERY CELL FOR ELECTRIC VEHICLE BATTERY PACK," which is incorporated herein by reference in its entirety.

BACKGROUND

Batteries can include electrochemical materials to supply electrical power to various electrical components connected thereto. Such batteries can provide electrical energy to various electrical systems.

SUMMARY

The present disclosure is directed to batteries cells for battery packs to power electrical vehicles. The disclosed battery cell can have both a positive terminal and a negative terminal on one end of the cell. Such a configuration allow for improvement in protection of the constituent component within the battery cell and consumption of time during the pack assembly process.

At least one aspect is directed to a battery cell of a battery pack to power electric vehicles. The battery cell can include a housing having a first end and a second end. The housing can define an inner region. An electrolyte can be disposed in the inner region defined by the housing. The battery cell can include a lid. A gasket can couple the lid with the first end of the housing to seal the battery cell. The gasket can include a first gasket surface and a second gasket surface. The first end of the housing can have a crimped edge disposed about the first gasket surface to couple the gasket with the first end of the housing and position the second gasket surface adjacent to the electrolyte. The crimped edge can have a first crimped surface. The first crimper surface can have a predetermined pattern to bond a wire with the first crimped surface. The crimped edge can have a second crimped surface that opposes the first gasket surface.

At least one aspect is directed to a method of providing battery cell of a battery pack to power electric vehicles. The method can include providing a housing having a first end and a second end. The housing can define an inner region. The method can include disposing an electrolyte in the inner region defined by the housing and providing a lid. The method can include coupling the lid with the first end of the housing using a gasket to seal the battery cell, the gasket having a first gasket surface and a second gasket surface. The method can include crimping the first end of the housing to form a crimped edge that is disposed about the first gasket surface to couple the gasket with the first end of the housing and position the second gasket surface adjacent to the electrolyte. The crimped edge can have a first crimped surface and a second crimped surface that opposes the first gasket surface. The method can include forming a predetermined pattern on the first crimped surface for wire bonding of a wire with the first crimped surface.

At least one aspect is directed to a method of supplying battery cells for battery packs of electric vehicles. The method can include providing a battery cell of a battery pack to power electric vehicles. The battery cell can include a housing having a first end and a second end. The housing can define an inner region. An electrolyte can be disposed in the inner region defined by the housing. The battery cell can include a lid. A gasket can couple the lid with the first end of the housing to seal the battery cell. The gasket can include a first gasket surface and a second gasket surface. The first end of the housing can have a crimped edge disposed about the first gasket surface to couple the gasket with the first end of the housing and position the second gasket surface adjacent to the electrolyte. The crimped edge can have a first crimped surface. The first crimped surface can have a predetermined pattern to bond a wire with the first crimped surface. The crimped edge can have a second crimped surface that opposes the first gasket surface.

At least one aspect is directed to an electric vehicle. The electric vehicle can include a battery pack that includes at least one battery cell to power the electric vehicle. The battery cell can include a housing having a first end and a second end. The housing can define an inner region. An electrolyte can be disposed in the inner region defined by the housing. The battery cell can include a lid. A gasket can couple the lid with the first end of the housing to seal the battery cell. The gasket can include a first gasket surface and a second gasket surface. The first end of the housing can have a crimped edge disposed about the first gasket surface to couple the gasket with the first end of the housing and position the second gasket surface adjacent to the electrolyte. The crimped edge can have a first crimped surface. The first crimped surface can have a predetermined pattern to bond a wire with the first crimped surface. The crimped edge can include a second crimped surface that opposes the first gasket surface.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Following below are more detailed descriptions of various concepts related to, and implementations of battery cells for battery packs in electric vehicles. The various concepts introduced above and discussed in greater detail below can be implemented in any of numerous ways.

The battery cells described herein can include at least one patterned surface that provides an increased welding or bonding area to perform wire boding (e.g., positive wire bonding, negative wire bonding to bond a wire with the patterned surface to electrically couple the battery cells with current collectors or bus bars) on the respective surface of the housing of a battery cell. For example, the battery cells can be formed using a crimping method to provide an increased area or surface to couple with one or more wire bonds. Using crimping dies, one or more surfaces of a housing of a battery cell can be patterned or otherwise manipulated to increase a respective surface area, thereby providing the increased welding or bonding area. For example, a top surface of a housing of a battery cell can include a crimped edge that can be patterned using one or more crimping dies to provide a larger surface area to perform wire bonding. The pattern can include, but not limited to, a ridges, divots, or other forms of deformations formed on the respective surface to increase the surface area of the respective surface. The crimped surfaces having the pattern can provide a larger surface area to perform wire bonding. Thus, a failure rate of the wire bonding can be reduced and a stronger wire bond (e.g., stronger joint point, stronger welding point) can be created.

Figure 1:
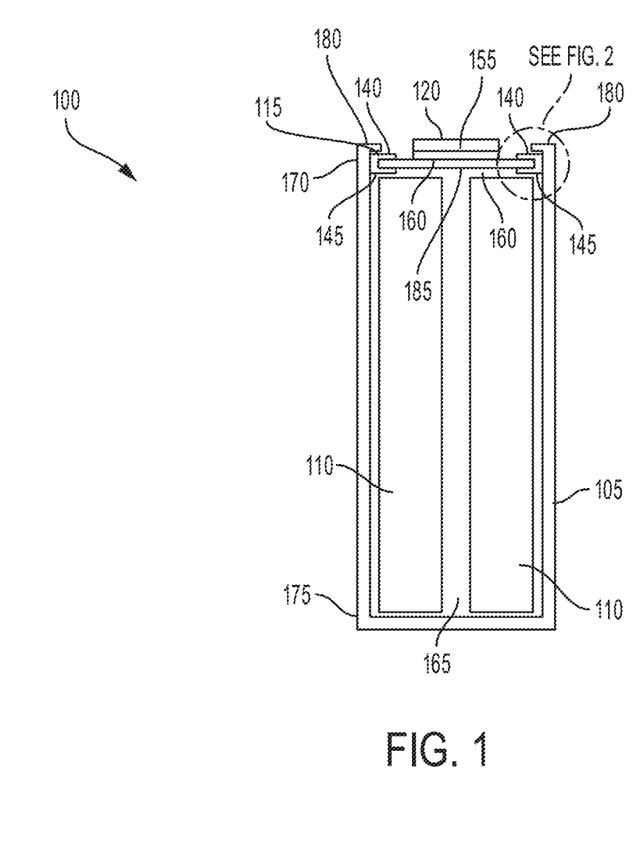
FIG. 1 is a block diagram depicting a cross-sectional view of an example battery cell for a battery pack in an electric vehicle.

FIG. 1, among others, depicts a cross-sectional view of a battery cell 100 for a battery pack in an electric vehicle. The battery cell 100 can provide energy or store energy for an electric vehicle. For example, the battery cell 100 can be included in a battery pack used to power an electric vehicle. The battery cell 100 can include at least one housing 105. The housing 105 can have a first end 170 and a second end 175. The battery cell 100 can be a lithium-air battery cell, a lithium ion battery cell, a nickel-zinc battery cell, a zinc-bromine battery cell, a zinc-cerium battery cell, a sodium-sulfur battery cell, a molten salt battery cell, a nickel-cadmium battery cell, or a nickel-metal hydride battery cell, among others. The housing 105 can be included or contained in a battery pack (e.g., a battery array or battery module) installed a chassis of an electric vehicle. The housing 105 can have the shape of a cylindrical casing or cylindrical cell with a circular, ovular, or elliptical base, as depicted in the example of the battery cell of FIG. 1. A height of the housing 105 can be greater than a width of the housing 105. For example, the housing 105 can have a length (or height) in a range from 65 mm to 75 mm and a width (or diameter for circular examples) in a range from 17 mm to 25 mm. In some examples the width or diameter of the housing 105 can be greater than the length (e.g., height) of the housing 105. The housing 105 can be formed from a prismatic casing with a polygonal base, such as a triangle, square, a rectangular, a pentagon, or a hexagon, for example. A height of such a prismatic cell housing 105 can be less than a length or a width of the base of the housing 105. The battery cell can be a cylindrical cell 21 mm in diameter and 70 mm in height. Other shapes and sizes are possible, such as a rectangular cells or rectangular cells with rounded edges, of cells between 17 mm to 25 mm in diameter or width, and 65 mm to 75 mm in length or height.

One architecture of a cylindrical lithium ion (or other type of) battery cell 100 can include a deep-drawn metal cylinder casing and a protective cap at the top end. The protective cap can include devices to prevent against fires and explosions. Electrical current can flow from an anode housed within the casing to an anode tab and then through the casing itself via a bonded wire connection. In this manner, the casing or housing 105 of the battery cell 100 can function as the negative terminal. The positive terminal of the battery cell 100 can be on a lateral (e.g., top) end of the structure, and can include a lid 120. The lid 120 can include a current interrupt device (CID), a rupture disk, and a gasket. The lid 120 can reside within a gasket 115 coupling the lid 120 to the housing 105. The sealing element can insulate the positive terminal from the negative terminal of the battery cell 100.

The battery cells 100 described herein can include both the positive terminal and the negative terminal disposed at a same lateral end (e.g., the top end) of the battery cell 100. The battery cell 100 can be attached to a negative busbar by bonding a wire between a crimped edge 180 of the casing and the negative busbar and to a positive busbar by bonding another wire between a table top and the positive busbar. Each battery cell 100 can also be attached to the negative busbar by bonding one wire to a bottom or side of the battery cell 100 and to the positive busbar by bonding another wire to a top of the battery cell 100.

The architecture of the battery cell 100 can also simplify bonding of wires to the tabs corresponding to the positive and negative terminals. The inclusion of differing protector element can incorporate redundancies in the event that either protector element fails during a breakdown event within the battery cell. By creating a surface having a pattern (e.g., pattern 225 of FIG. 2) that provides an increased surface area, the patterned surface of the battery cell 100 can provide an increased area available for bonding, thereby improving the pack assembly process by making it easier to bond wires to each battery cell 100. In addition, having both tabs for the positive and the negative terminals on one end of the battery cell 100 can eliminate wire bonding to one side of the battery pack and welding of a tab to another side of the battery cell 100 (e.g., the bottom end or the crimped region). In this manner, a terminal or an electrode tab along the bottom of the battery cell 100 can be eliminated from the structure. Additionally, using the patterning techniques described herein, the amount of surface area along the top end of the battery cell 100 can be enlarged, thus improving the pack assembly process by making it easier to bond the wire to each tab (e.g., positive tab, negative tab) of the battery cell 100.

The housing 105 of the battery cell 100 can include at least one electrically or thermally conductive material, or combinations thereof. The electrically conductive material can also be a thermally conductive material. The electrically conductive material for the housing 105 of the battery cell 100 can include a metallic material, such as aluminum, an aluminum alloy with copper, silicon, tin, magnesium, manganese or zinc (e.g., of the aluminum 4000 or 5000 series), iron, an iron-carbon alloy (e.g., steel), silver, nickel, copper, and a copper alloy, among others. The electrically conductive material and thermally conductive material for the housing 105 of the battery cell 100 can include a conductive polymer. To evacuate heat from inside the battery cell 100, the housing 105 can be thermally coupled to a thermoelectric heat pump (e.g., a cooling plate) via an electrically insulating layer. The housing 105 can include an electrically insulating material. The electrically insulating material can be a thermally conductive material. The electrically insulating and thermally conductive material for the housing 105 of the battery cell 100 can include a ceramic material (e.g., silicon nitride, silicon carbide, titanium carbide, zirconium dioxide, beryllium oxide, and among others) and a thermoplastic material (e.g., polyethylene, polypropylene, polystyrene, or polyvinyl chloride), among others. To evacuate heat from inside the battery cell 100, the housing 105 can be thermally coupled to a thermoelectric heat pump (e.g., a cooling plate). The housing 105 can be directly thermally coupled to the thermoelectric heat pump without an addition of an intermediary electrically insulating layer.

The housing 105 of the battery cell 100 can include the first end 170 (e.g., top portion) and the second end 175 (e.g., bottom portion). The housing 105 can define the inner region 165 between the first end 170 and the second end 175. For example, the inner region 165 can include an interior of the housing 105 or an inner area formed by the housing 105. The first end 170, inner region 165, and the second end 175 can be defined along one axis of the housing 105. For example, the inner region 165 can have a width (or diameter for circular examples) of 2 mm to 6 mm and a length (or height) of 50 mm to 70 mm. The first end 170, inner region 165, and second end 175 can be defined along a vertical (or longitudinal) axis of cylindrical casing forming the housing 105. The first end 170 at one end of the housing 105 (e.g., a top portion as depicted in FIG. 1). The second end 175 can be at an opposite end of the housing 105 (e.g., a bottom portion as depicted in FIG. 1). The end of the second end 175 can encapsulate or cover the corresponding end of the housing 105.

At least one electrolyte 110 can be disposed in the inner region 165 of the housing 105. The electrolytes 110 can include a negative electronic charge region or terminus and a positive electronic charge region or terminus. At least one negative tab can couple the electrolytes 110 (e.g., negative region of electrolytes 110) with the surface of the housing 105 or the negative lid portion of the lid 120. For example, a negative portion of the electrolytes 110 can be coupled with one or more surfaces of the housing 105 or a negative region 185 of the lid 120, such as to form a negative surface area on the lid 120 for negative wire bonding. A positive portion of the electrolyte 110 can be coupled to a positive region 155 of the lid 120 to form a positive surface area on the lid 120 for positive wire bonding. An insulating region 160 can be disposed between the positive region 155 of the lid 120 and the negative region 185 of the lid 120. The insulating region 160 can electrically insulate the positive region 155 of the lid 120 from the negative region 185 of the lid 120. Thus, the lid 120 can include a negative surface area and a positive surface area. The negative portion or the positive portion of the electrolyte 110 can be coupled with the housing 105 or the lid 120 through negative or positive tabs, respectively. An insulating region 160 may be disposed between an inner surface of the housing 105 and the electrolytes 110 disposed within the inner region 165 of the housing 105 to electrically insulate the housing 105 from the electrolytes 110.

The electrolyte 110 can include any electrically conductive solution, dissociating into ions (e.g., cations and anions). For a lithium-ion battery cell, for example, the electrolyte 110 can include a liquid electrolyte, such as lithium bisoxalatoborate (LiBC4O8 or LiBOB salt), lithium perchlorate (LiClO4), lithium hexaflourophosphate (LiPF6), and lithium trifluoromethanesulfonate (LiCF3SO3). The electrolyte 110 can include a polymer electrolyte, such as polyethylene oxide (PEO), polyacrylonitrile (PAN), poly (methyl methacrylate) (PMMA) (also referred to as acrylic glass), or polyvinylidene fluoride (PVdF). The electrolyte 110 can include a solid-state electrolyte, such as lithium sulfide (Li2S), magnesium, sodium, and ceramic materials (e.g., beta-alumna).

A single electrolyte 110 can be disposed within inner region 165 of the housing 105 or multiple electrolytes 110 (e.g., two electrolytes, more than two electrolytes) can be disposed within inner region 165 of the housing 105. For example, two electrolytes 110 can be disposed within inner region 165 of the housing 105. The number of electrolytes 110 can vary and can be selected based at least in part on a particular application of the battery cell 100.

Figure 6:
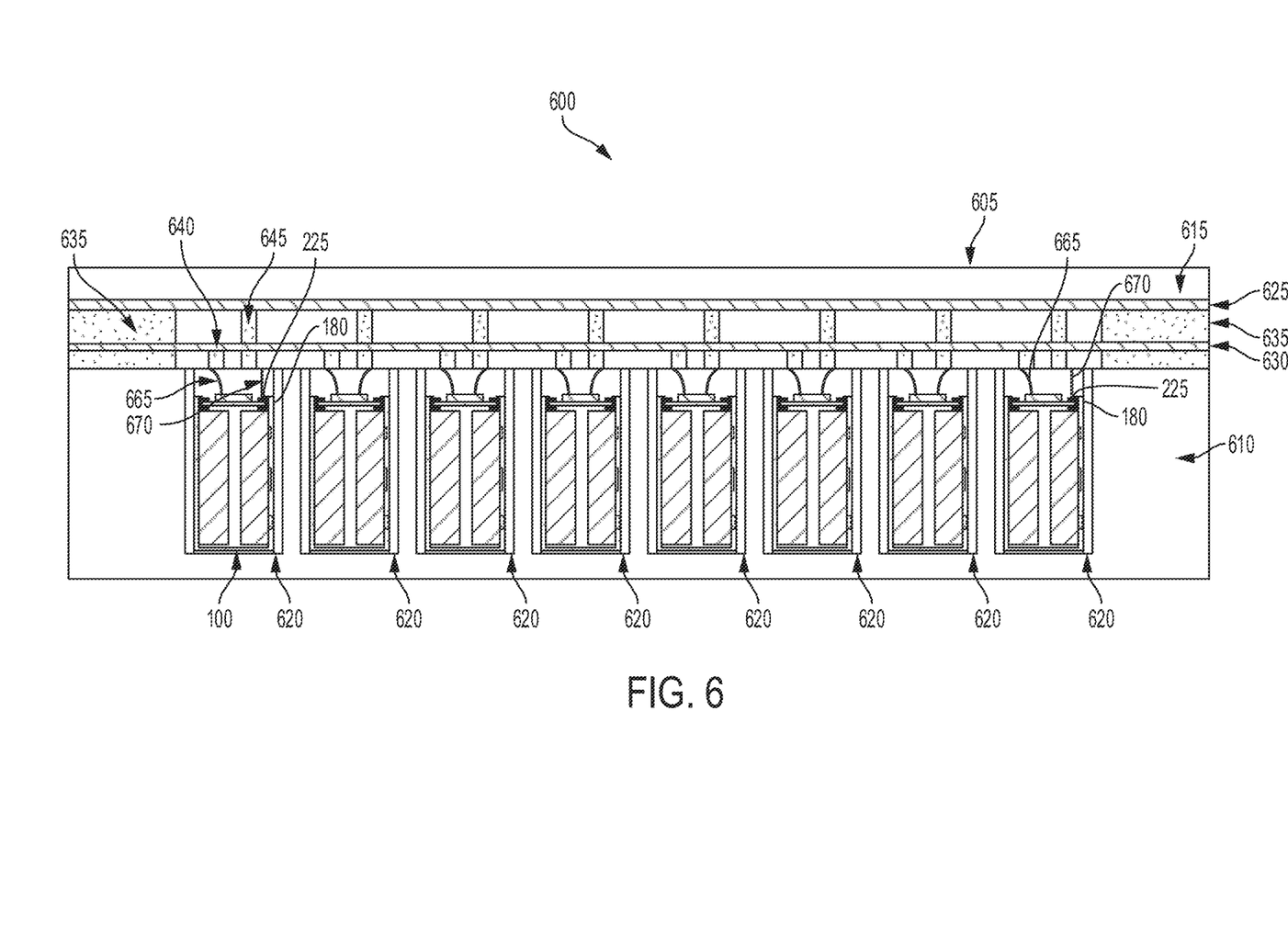
FIG. 6 is a block diagram depicting a cross-sectional view of an example battery pack for holding battery cells in an electric vehicle.

At least one lid 120 can be disposed proximate to the first end 170 of the housing 105. The lid 120 can include a current interrupter device (e.g., CID). The lid 120 can be disposed onto the first lateral end 170 of the housing 105. The lid 120 can include a negative region 185 and a positive region 155. For example, the negative lid portion can operate as the negative terminal of the battery cell 100 and the positive lid portion can operate as the positive terminal of the battery. The battery cell 100 can couple with positive and negative current collectors of a battery module of an electric vehicle through the positive lid portion and the negative lid portion of the lid 120 (as shown in FIG. 6). For example, via a module tab connection (or other techniques such as wire bonding of a wire), the positive lid portion and the negative lid portion of the lid can couple the battery cell 100 with current collectors of the battery module from the lateral ends (e.g., top or bottom) or from longitudinal sides of the battery cell 100. One or more battery modules can form a battery pack disposed in an electric vehicle to power a drive train of the electric vehicle.

The lid 120 can couple with the electrolyte 110 through one or more tabs. For example, a negative tab can couple the electrolyte 110 with the negative lid portion of the lid 120. When the negative lid portion of the lid 120 is coupled with the electrolyte 110 through the negative tab, the housing 105 may include non-conductive material. A positive tab can couple the electrolyte 110 (e.g., positive region of electrolytes 110) with the positive lid portion of the lid 120. At least one insulating region 160 can separate or electrically isolate the positive lid portion from the negative lid portion. The insulating region 160 may include dielectric material.

At least one gasket 115 (e.g., sealing element) can be disposed to couple the lid 120 with the first end 170 of the housing 105. The gasket 115 can house, retain, hold, secure, seal, or otherwise include the lid 120. The gasket 115 can include a gasket, a washer, an O-ring, a cap, a fitting, a hose coupling, or any other component to house, retain, hold, secure, or seal the lid 120 with the housing 105. The gasket 115 can couple with the lid 120 to secure or hold the lid 120 in place and seal the battery cell 100. The seal can be hermetic or sufficient to prevent leakage of the electrolyte 110. For example, the gasket 115 can form the seal across the first end 170 of the housing 105 using the lid 120. The seal formed by the gasket 115 can include any type of mechanical seal, such as a hermetic seal, an induction seal, a hydrostatic seal, a hydrodynamic seal, and a bonded seal, among others. The gasket 115 can include electrically insulating material to electrically isolate portions of the lid 120 (e.g., negative lid portion, positive lid portion) from the housing 105. The gasket 115 can include thermally conductive material to allow heat to evacuate from the inner region 165.

The gasket 115 can couple with the edge or side portion of the lid 120 to secure the lid 120 to the housing 105. The gasket 115 can be positioned on, touching, adjacent or proximate to (e.g., within 1 mm of) or be at least partially supported by an inner surface of the housing 105. Intervening elements such as insulative or protective layers of material can be present between adjacent or proximate elements so that the adjacent or proximate elements can be directly or indirectly in contact with each other. For example, the inner surface may be in contact with the gasket 115 or the inner surface may include an indentation that is in contact with the gasket 115 to support the gasket 115 and seal the battery cell 100. The gasket 115 can include a first gasket surface 140 that is disposed proximate to or in contact with the crimped edge 180 and a second gasket surface 145 that is disposed proximate to or adjacent to a surface (e.g., top surface) of the electrolyte 110. The gasket 115 can be held in place by inserting an indentation into the battery cell housing 105 wall at a predetermined distance (e.g., 2.5 mm to 6 mm) below the surface of the crimped edges (or surfaces) 180 around the entire circumference of the housing 105. The crimp edges 180 can create a compressive seal between it and the surface created by the indentation holding the lid 120 and the gasket 115 in place. The battery cell 100 may include multiple gaskets 115 disposed to couple the lid 120 with the first end 170 of the housing 105.

The gasket 115 can be positioned within the housing 105 such that the lid 120 is disposed over the electrolytes 110. The gasket 115 can be disposed such that they separate the lid 120 from the electrolyte 110. When, for example the battery cell 100 includes two lids 120, e.g., one lid for a positive terminal and one lid for a negative terminal disposed at a same lateral edge of the battery cell 100 (e.g., the top), the battery cell 100 can include two gaskets 115, one for each lid or terminal.

The housing 105 can include one or more crimped edges 180 to house, retain, hold, secure, or seal the gasket 115 to the first end 170 of the housing 105. The first lateral end 170 of the housing 105 can include one or more crimped edges 180 that can be formed such that the respective crimped edges bend over (or are crimped over) the first gasket surface 140 of the gasket 115 to secure the gasket 115 and seal the battery cell 100. For example, a first crimped edge 180 can be formed or disposed about a first gasket 115. The first crimped edge 180 may include at least one surface (e.g., top surface) having a predetermined pattern that increases a surface area of the respective surface of the first crimped edge 180. A second crimped edge 180 can be formed or disposed about a second gasket 115. The second crimped edge 180 may include at least one surface (e.g., top surface) having a predetermined pattern that increases a surface area of the respective surface of the first crimped edge 180. The pattern formed on the surface of the second crimped edge 180 can be the same as the pattern formed on the surface of the first crimped edge 180. The pattern formed on the surface of the second crimped edge 180 may be different from the pattern formed on the surface of the first crimped edge 180.

The crimped edges 180 of the first end 170 of the housing 105 can fold, pinch, be bent towards or engage with the gasket 115. The crimped edges 180 can be disposed about at least one side of the gasket 115 to hold the gasket 115 in place, such as but not limited to, hold the gasket 115 in position against a surface (e.g., top surface) of the electrolyte 110 or an insulating region 160 disposed between the gasket 115 and the electrolyte 110 and seal the battery cell 100. The crimped edges 180 can have a length from its respective outer diameter to its respective inner diameters in a range of 1 mm to 3 mm and can span or cover portions of the gasket 115 in a range of 360 degrees. The thickness or length from the outer diameter to the inner diameter of the crimped edges 180 can be formed to be similar or the same as the thickness of the housing 105 (e.g., 0.15 mm to 0.35 mm). The seal formed by the gasket 115 can be hermetic or fluid resistant so that the electrolyte 110 does not leak from its location within the housing 105. The lid 120 can be spaced a distance from the electrolyte 110 with the distance corresponding to a thickness of a portion of the gasket 115.

Figure 2:
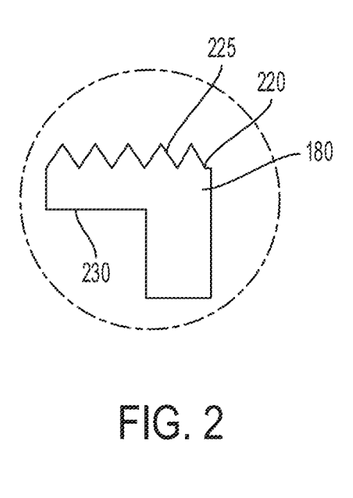
FIG. 2 is a block diagram of a surface of a crimped edge of an example battery cell for a battery pack in an electric vehicle.

FIG. 2 depicts an exploded view of a crimped edge 180 having a first surface 220 and a second, opposing surface 230. The second crimped surface 230 can be formed such that it contacts or is disposed over a first gasket surface 140 of the gasket 115. The first surface 220 of the crimped edge 180 of the battery cell 100 can include a pattern 225. The crimped edges 180 can include a patterned surface 220 or a portion of the first surface 220 of the crimped edges 180 can include a predetermined pattern 225. The first surface 220 can correspond to a top surface of the crimped edges 180 or a surface opposite the surface of the crimped edges 180 in contact with the gasket 115. The pattern 225 can be formed on the first surface 220 of the crimped edges 180 in a variety of different shapes or deformations formed into the surface 220 to increase a surface area of the first surface 220. For example, the pattern 225 can be used to increase a surface area of the crimped edges 180 for wire bonding of a wire with the crimped edge(s) 180 to couple the respective battery cell 100 within a battery pack of an electric vehicle.

The pattern 225 can include a series of ridges formed on the crimped edges 180. The dimensions (e.g., height) of the ridges can range from 200μ to 500μ in height with respect to the first surface 220 of the crimped edges 180. The pattern 225 can include a series of divots or other deformations formed on the surface 220. The pattern 225 can include a hatched pattern. The pattern 225 formed on the crimped edges 180 can include other shapes, sizes and dimensions outside these described herein. The pattern 225 can be formed on one crimped edge 180 of a battery cell 100. The pattern 225 can be formed on multiple crimped edges 180 of a battery cell 100.

Figure 3:
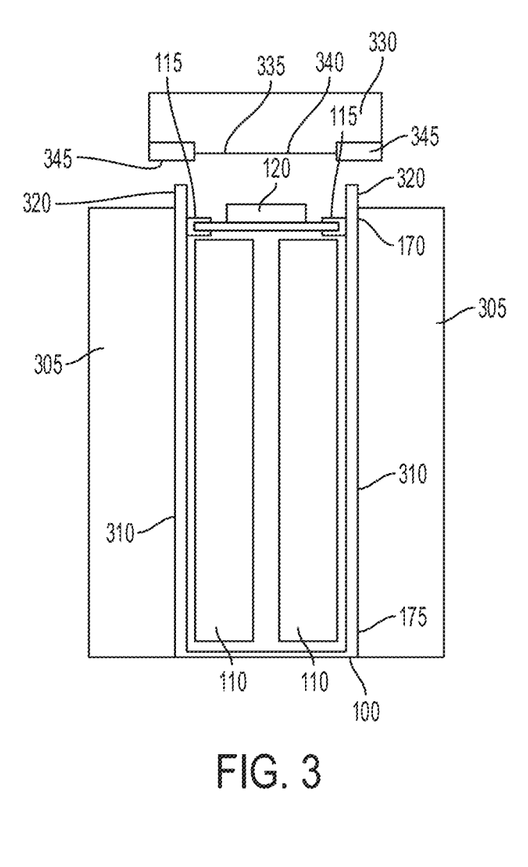
FIG. 3 depicts an example battery cell and a first crimper die having a first partnered surface used to seal one or more surfaces of the battery cell.

FIG. 3 depicts an example battery cell 100 held in place by a first crimper holder 305 and a second crimper holder 305. The first crimper holder 305 can be in contact with a first side surface 310 of the battery cell 100 and the second crimper holder 305 can be in contact with a second side surface 310 of the battery cell 100. The first side surface 310 can be a different (e.g., opposite) side surface from the second side surface 310. The first and second crimper holders 305 can hold the battery cell 100 in place during a crimping process to form crimped edges 180. For example, and a depicted in FIG. 3, the first end 170 of the battery cell 100 can include straight edges 320 (or non-crimped edges). The straight edges 320 can correspond to a top surface of the first end 170 of the battery cell 100 prior to being crimped. For example, the straight edges 320 can correspond to the crimped edges 180 of the battery cell 100 of FIG. 1, prior to being crimped.

A first crimper die 330 can be used to form the crimped edges 180 from the straight edges 320. The first crimper die 330 can include a first surface 335 that is applied to or otherwise contacts the straight edges 320 during a crimping process. The first surface 335 can be a flat surface or a straight surface. For example, the first surface 335 of the first crimper die 330 can be a smooth surface having no indentations or deformations formed thereon. A length of the first surface 335 of the first crimper die 330 can range from 1 mm to 10 mm. The first crimper die 330 may include a recess region 340 and an application surface 345. For example, the first surface 335 can include first and second application surfaces 345 with a recess region 340 formed between the first and second application surfaces 340. The application surfaces 345 may be formed at ends or edges of the first surface 335 and the recess region 340 can correspond to a middle region of the first surface 335. The application surfaces 345 can extend beyond an edge of the recess region 340 such that the application surfaces 345 can contact straight edges 320 of the housing 105 during a crimping process. The dimensions of the application surfaces 345 can be formed or sized based in part on the dimensions of the straight edges 320 and the lid 120. For example, the application surfaces 345 can be formed having the same dimensions (e.g., length) as the dimensions of the straight edges 320 of the housing 105. The recess region 340 can be formed and sized based in part on the dimensions of the lid 120. The difference in depth between the recess region 340 and the application surfaces 345 can correspond to a height the lid 120 extends above or beyond the straight edges 320 when the straight edges are compressed to form the crimped edges 180. For example, the recess region 340 can be formed or sized such that it does not contact the lid 120 when the application surfaces 345 are in contact with the straight edges 320 during the crimping process. The first crimper holder 305, second crimper holder 305, and first crimper die 3330 (and second crimper die 430 of FIG. 4) can include or be formed from metal material, such as but not limited to stainless steel.

Figure 4:
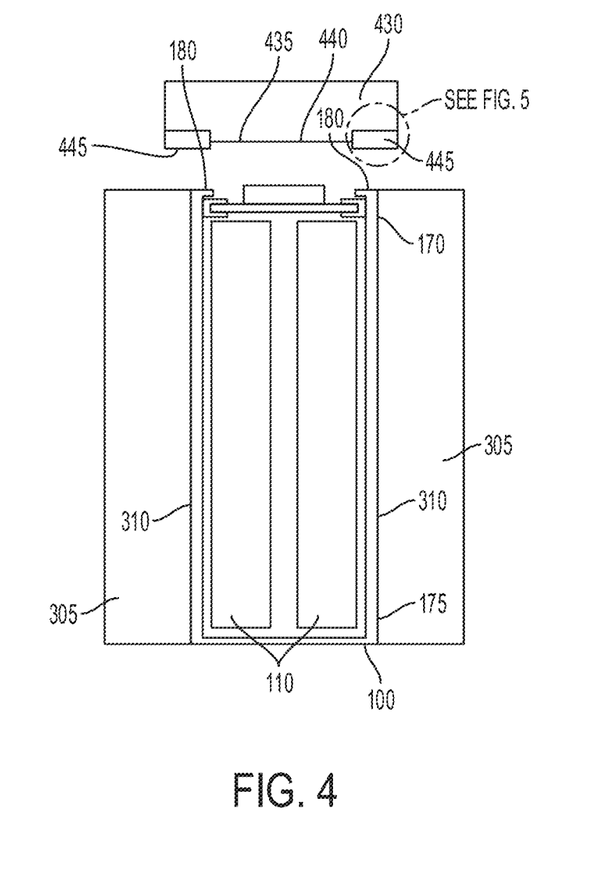
FIG. 4 depicts an example battery cell and a second crimper die having a second patterned surface used to pattern the one or more surfaces of the battery cell.
Figure 5:
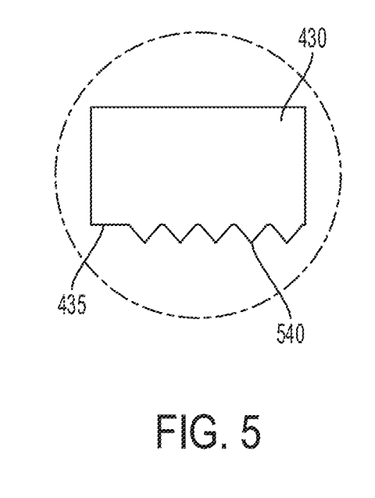
FIG. 5 is an exploded view of the second patterned surface of the second crimper die of FIG. 4.

FIG. 4 depicts an example battery cell 100 held in place by the first crimper holder 305 and the second crimper holder 305 and a second crimper die 430. The first and second crimper holders 305 can hold the battery cell 100 in place during a crimping process to form a patterned surface on the crimped edges 180. For example, and briefly referring to FIG. 5, an exploded view of the first surface 435 of the first crimper die 430 is provided having a pattern 540. The pattern 540 of the second crimper die 430 can correspond to or be the same as the pattern 225 of the crimped edges 180 as shown in FIG. 1. For example, the pattern 540 can include a series of ridges formed on the first surface 435 of the second crimper die 430. The dimensions (e.g., height) of the ridges can range from 200μ to 500μ in height with respect to the first surface 435 220 of the crimper die 430. The pattern 540 can include a series of divots or other deformations formed on the surface 220. The pattern 540 can include a hatched pattern. The pattern 540 formed on the first surface 435 of the second crimper die 430 can include other shapes, sizes and dimensions outside these described herein. A length of the first surface 435 of the first crimper die 430 can range from 1 mm to 10 mm.

As depicted in FIG. 4, among others, the first surface 435 of the second crimper die 430 can be applied to the crimped edges 180 of the battery cell 100. The pattern 540 on the first surface 435 of the second crimper die 430 can form a patterned surface on the top surface of the crimped edges 180. For example, the pattern 540 on the first surface 435 of the second crimper die 430 can form the pattern 225 on the top surface of the crimped edges 180 to increase surface area of the top surface of the crimped edges 180, for example, to bond (e.g., weld) one end of a wire with the patterned area 225 of the crimped edge 180. The other end of the wire can bond or otherwise couple with a current collector or busbar to provide current or electrical power from the battery cell 100 to power the electric vehicle.

The second crimper die 430 may include a recess region 440 and an application surface 445. For example, the first surface 435 can include first and second application surfaces 445 with a recess region 440 formed between the first and second application surfaces 445. The application surfaces 445 can be formed at ends or edges of the first surface 435 and the recess region 440 can correspond to a middle region of the first surface 435. The application surfaces 445 can extend beyond an edge of the recess region 440 such that the application surfaces 445 can contact crimped edges 180 during a crimping process. The application surfaces 445 can include the pattern 540. The dimensions of the application surfaces 445 can be formed or sized based in part on the dimensions of the crimped edges 180 and the lid 120. For example, the application surfaces 445 can have the same dimensions (e.g., length) as the crimped edges 180. The recess region 440 can be formed and sized based in part on the dimensions of the lid 120. For example, the difference in depth between the recess region 440 and the application surfaces 445 can correspond to a height the lid 120 extends above or beyond the top surface of the crimped edges 180. The recess region 440 can be formed or sized such that it does not contact the lid 120 when the application surfaces 445 are in contact with the crimped edges 180 during the crimping process.

FIG. 6 depicts a cross-section view 600 of a battery pack 605 to hold a plurality of battery cells 100 in an electric vehicle. The battery cells 100 can include crimped edges 180 having a pattern 225 formed thereon. For example, the battery pack 605 can include a plurality of the battery cells 100 having the crimped edge 180 with crimped surface 220 having, for example, the pattern 225. The battery pack 605 can include a battery case 610 and a capping element 615. The battery case 610 can be separated from the capping element 615. The battery case 610 can include or define a plurality of holders 620. Each holder 620 can include a hollowing or a hollow portion defined by the battery case 610. Each holder 620 can house, contain, store, or hold a battery cell 100. The battery case 610 can include at least one electrically or thermally conductive material, or combinations thereof. The battery case 610 can include one or more thermoelectric heat pumps. Each thermoelectric heat pump can be thermally coupled directly or indirectly to a battery cell 100 housed in the holder 620. Each thermoelectric heat pump can regulate temperature or heat radiating from the battery cell 100 housed in the holder 620. The first bonding element 665 and the second bonding element 670 can extend from the battery cell 100 through the respective holder 620 of the battery case 610. For example, the first bonding element 665 or the second bonding element 670 can couple with the crimped edges 180 having pattern 225 formed thereon.

Between the battery case 610 and the capping element 615, the battery pack 605 can include a first busbar 625, a second busbar 630, and an electrically insulating layer 635. The first busbar 625 and the second busbar 630 can each include an electrically conductive material to provide electrical power to other electrical components in the electric vehicle. The first busbar 625 (sometimes referred to herein as a first current collector) can be connected or otherwise electrically coupled to the first bonding element 665 extending from each battery cell 100 housed in the plurality of holders 620 via a bonding element 645. The bonding element 645 can include electrically conductive material, such as but not limited to, a metallic material, aluminum, or an aluminum alloy with copper. The bonding element 645 can extends from the first busbar 625 to the first bonding element 665 extending from each battery cell 100. The bonding element 645 can be bonded, welded, connected, attached, or otherwise electrically coupled to the second bonding element 670 extending from the battery cell 100. The first bonding element 665 can define the first polarity terminal for the battery cell 100. The first busbar 625 can define the first polarity terminal for the battery pack 605. The second busbar 630 (sometimes referred to as a second current collector) can be connected or otherwise electrically coupled to the second bonding element 670 extending from each battery cell 100 housed in the plurality of holders 620 via a bonding element 640. The bonding element 640 can include electrically conductive material, such as but not limited to, a metallic material, aluminum, or an aluminum alloy with copper. The bonding element 640 can extends from the second busbar 630 to the second bonding element 670 extending from each battery cell 100. The bonding element 640 can be bonded, welded, connected, attached, or otherwise electrically coupled to the second bonding element 670 extending from the battery cell 100. The second bonding element 670 can define the second polarity terminal for the battery cell 100. The second busbar 630 can define the second polarity terminal for the battery pack 605.

The first busbar 625 and the second busbar 630 can be separated from each other by the electrically insulating layer 635. The electrically insulating layer 635 can include any electrically insulating material or dielectric material, such as air, nitrogen, sulfur hexafluoride (SF6), porcelain, glass, and plastic (e.g., polysiloxane), among others to separate the first busbar 625 from the second busbar 630. The electrically insulating layer 635 can include spacing to pass or fit the first bonding element 665 connected to the first busbar 625 and the second bonding element 670 connected to the second busbar 630. The electrically insulating layer 635 can partially or fully span the volume defined by the battery case 610 and the capping element 615. A top plane of the electrically insulating layer 635 can be in contact or be flush with a bottom plane of the capping element 615. A bottom plane of the electrically insulating layer 635 can be in contact or be flush with a top plane of the battery case 610.

Figure 7:
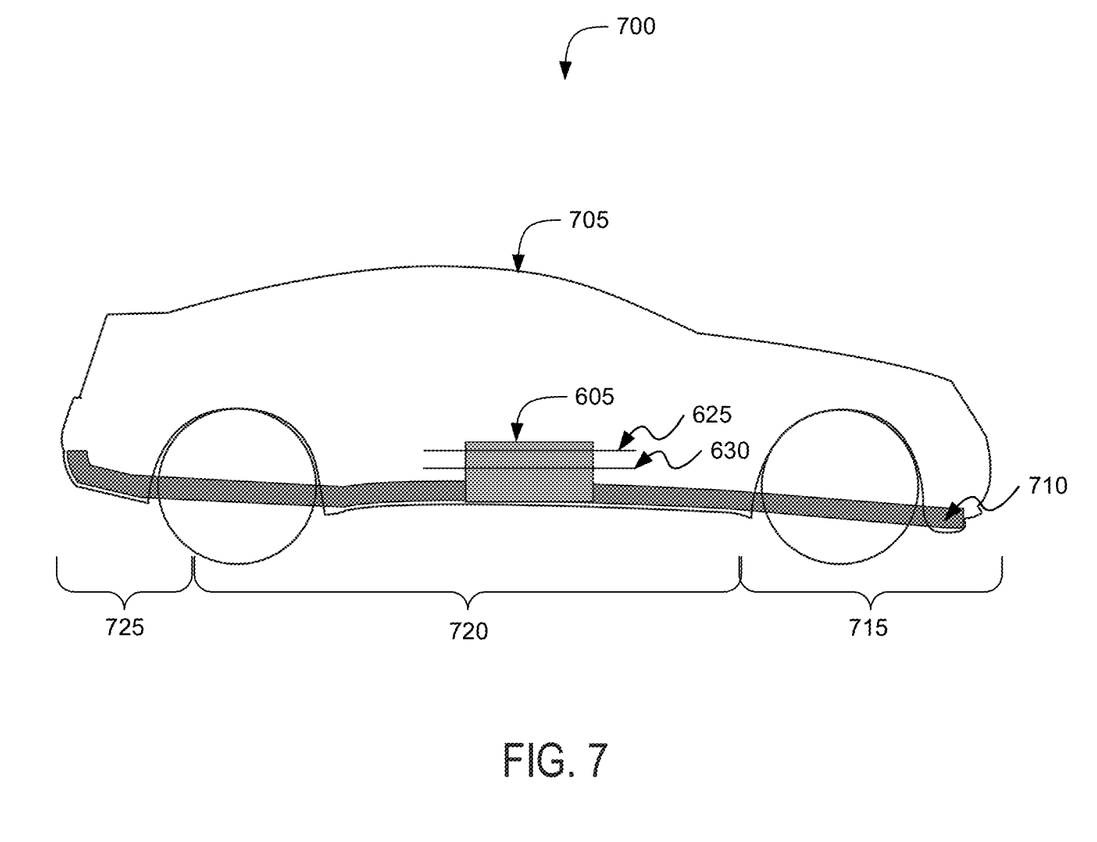
FIG. 7 is a block diagram depicting a cross-sectional view of an example electric vehicle installed with a battery pack.

FIG. 7 depicts a cross-section view 700 of an electric vehicle 705 installed with a battery pack 605. The battery pack 605 can include at least one battery cell 100 having at least one crimped edge 180 having a pattern 225. For example, the battery cells 100 described herein can be used to form battery packs 605 residing in electric vehicles 705 for an automotive configuration. An automotive configuration includes a configuration, arrangement or network of electrical, electronic, mechanical or electromechanical devices within a vehicle of any type. An automotive configuration can include battery cells for battery packs in vehicles such as electric vehicles (EVs). EVs can include electric automobiles, cars, motorcycles, scooters, passenger vehicles, passenger or commercial trucks, and other vehicles such as sea or air transport vehicles, planes, helicopters, submarines, boats, or drones. EVs can be fully autonomous, partially autonomous, or unmanned. Thus, the electric vehicle 705 can include an autonomous, semi-autonomous, or non-autonomous human operated vehicle. The electric vehicle 705 can include a hybrid vehicle that operates from on-board electric sources and from gasoline or other power sources. The electric vehicle 705 can include automobiles, cars, trucks, passenger vehicles, industrial vehicles, motorcycles, and other transport vehicles. The electric vehicle 705 can include a chassis 710 (sometimes referred to herein as a frame, internal frame, or support structure). The chassis 710 can support various components of the electric vehicle 705.

The chassis 710 can span a front portion 715 (sometimes referred to herein a hood or bonnet portion), a body portion 720, and a rear portion 725 (sometimes referred to herein as a trunk portion) of the electric vehicle 705. The front portion 715 can include the portion of the electric vehicle 705 from the front bumper to the front wheel well of the electric vehicle 705. The body portion 720 can include the portion of the electric vehicle 705 from the front wheel well to the back wheel well of the electric vehicle 705. The rear portion 725 can include the portion of the electric vehicle 705 from the back wheel well to the back bumper of the electric vehicle 705.

The battery pack 605 that includes at least one battery cell 100 having the crimped edge 180 with crimped surface 220 having a predetermined pattern 225 can be installed or placed within the electric vehicle 705. For example, the battery pack 605 can couple with a drive train unit of the electric vehicle 705. The drive train unit may include components of the electric vehicle 705 that generate or provide power to drive the wheels or move the electric vehicle 705. The drive train unit can be a component of an electric vehicle drive system. The electric vehicle drive system can transmit or provide power to different components of the electric vehicle 705. For example, the electric vehicle drive train system can transmit power from the battery pack 605 to an axle or wheels of the electric vehicle 705. The battery pack 605 can be installed on the chassis 710 of the electric vehicle 705 within the front portion 715, the body portion 720 (as depicted in FIG. 7), or the rear portion 725. A first bus-bar 625 and a second bus-bar 630 can be connected or otherwise be electrically coupled with other electrical components of the electric vehicle 705 to provide electrical power from the battery pack 605 to the other electrical components of the electric vehicle 705. For example, the first busbar 625 can couple with a crimped edge 180 having a pattern 225 of at least one battery cell 100 of the battery pack 605 through a wirebond or bonding element (e.g., bonding element 645 of FIG. 6). The second busbar 625 can couple with a crimped edge 180 having a pattern 225 of at least one battery cell 100 of the battery pack 605 through a wirebond or bonding element (e.g., bonding element 640 of FIG. 6).

Figure 8:
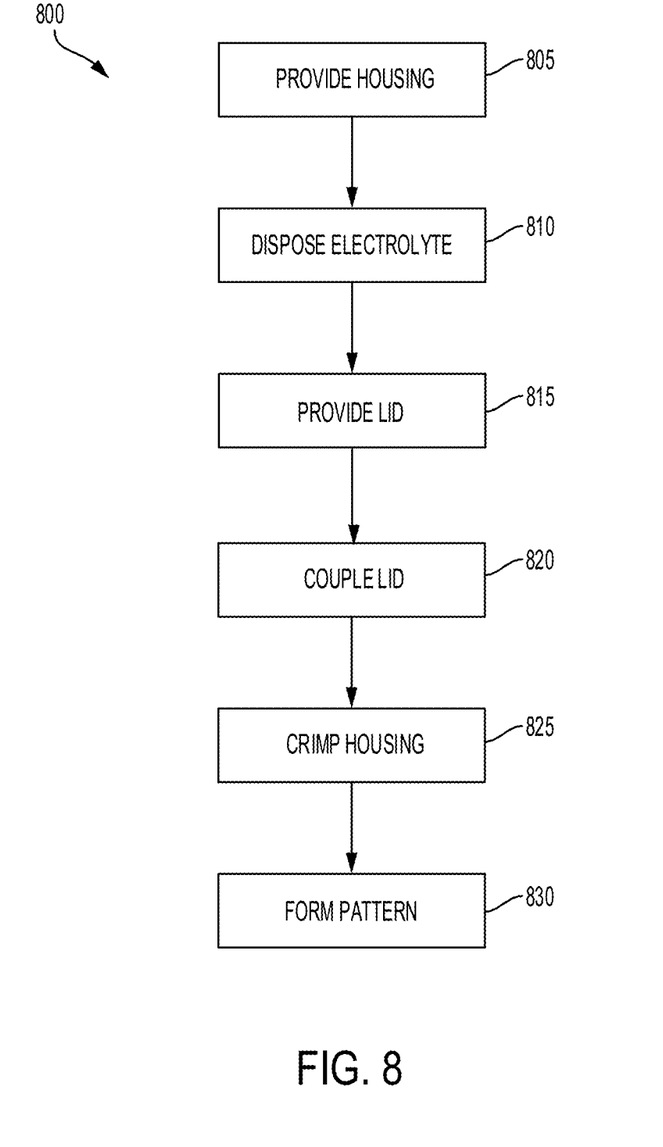
FIG. 8 is a flow diagram depicting an example method of providing battery cells for battery packs for electric vehicles.

FIG. 8 depicts a method 800 of providing battery cell 100 of a battery pack 605 for electric vehicles 705. The method 800 can include providing a housing 105 (ACT 805). A housing 105 of a battery cell 100 can be provided. The housing can include a first end 170 and a second end 175. The housing 105 can be formed having or defining an inner region 165. The battery cell 100 can be a lithium ion battery cell, a nickel-cadmium battery cell, or a nickel-metal hydride battery cell. The battery cell 100 can be part of a battery pack 605 installed within a chassis 710 of an electric vehicle 705. The housing 105 can be formed from a cylindrical casing with a circular, ovular, or elliptical base or from a prismatic casing with a polygonal base.

The method 800 can include disposing an electrolyte 110 (ACT 810). The electrolyte 110 can be disposed in the inner region 165 defined by the housing 105 of the battery cell 100. A single electrolyte 110 can be disposed within the inner region 165 or multiple electrolytes 110 (e.g., two or more) can be disposed within the inner region 165. The electrolytes 110 can be positioned within the inner region 165 such that they are spaced evenly from each other. For example, the electrolytes 110 can be positioned within the inner region 165 such that they are not in contact with each other. One or more insulating regions 160 may be disposed between different electrolytes 110 within the same or common inner region 165. The electrolytes 110 can be positioned within the inner region 165 such that they are spaced a predetermined distance from an inner surface of the housing 105. For example, one or more insulating regions 160 may be disposed between different inner surfaces of the housing 105 and the electrolytes 110 within the inner region 165 to insulate the housing 105 from the electrolytes 110. Thus, a distance the electrolytes 110 are spaced from the inner surface of the housing 105 can correspond to a thickness of the housing 105.

Multiple electrolytes 110 can be disposed in the inner region 165 defined by the housing 105. The gasket 115 can be disposed adjacent to each of the multiple electrolytes 110. For example, the gasket 115 can be disposed over a top surface of each of the multiple electrolytes 110. The second gasket surface 145 can be disposed proximate to or nearest to the top surface of each of the multiple electrolytes 110. The gasket 115 can be positioned such that it spaces the lid 120 a predetermined distance from the top surface of each of the multiple electrolytes 110.

The method 800 can include providing a lid 120 (ACT 815). The lid can be disposed over a surface of the electrolyte 110. For example, the lid 120 can be disposed over a top surface of the electrolyte 110. The lid 120 can be positioned such that it is not in contact with the electrolyte 110. The lid 120 can be spaced a predetermined distance from the top surface of the electrolyte 110. For example, an insulating region 160 can be disposed between the lid 120 and the top surface of the electrolyte 110 to isolate (e.g., electrically isolate) portions of the lid 120 from the electrolyte 110.

The lid 120 can be formed having a positive region 155 and a negative region 185. For example, the method 800 can include forming a positive region 155 on the lid 120 and forming a negative region 185 on the lid. An insulating region 160 can be formed between the positive region 155 and the negative region 185 on the lid 120. The insulating region 160 can electrically insulate the positive region 155 from the negative region 185.

The positive region 155 can be formed having a shape corresponding to the shape of the housing 105. For example, the positive region 155 can be formed having a circular, ovular, elliptical, rectangular, or square shape. The positive region 155 can be formed having a diameter in a range from 2 mm to 4 mm. The insulating region 160 can be formed such that it is disposed between the positive region 155 and the negative region 185. For example, insulating region 160 can be formed or disposed such that it is in contact with at least one surface of the positive region 155. The insulating region 160 can be formed or disposed around an outer perimeter or edge surface of the positive region 155. The insulating region 160 can be formed or disposed under a bottom surface of the positive region 155. The insulating region 160 can have a thickness in a range from 2 mm to 4 mm. The negative region 185 can be formed or disposed such that it is in contact with at least one surface of the insulating region 160. The negative region 185 can be formed or disposed around an outer perimeter or edge surface of the insulating region 160. The negative region 185 can be formed or disposed under a bottom surface of the insulating region 160. The negative region 185 can have a thickness in a range from 2 mm to 4 mm. The method 800 can include electrically isolating the positive region 155 from the negative region 185 using the insulating region 160. For example, the insulating region 160 can be disposed or coupled between the positive region 155 and the negative region 185 to electrically insulate the positive region 155 from the negative region 185.

The positive region 155 can couple with a positive portion of the electrolyte 110, for example, through a negative tab or wirebond. For example, a positive tab can include a first end that is soldered or welded to the positive region 155 and a second end that couples with a top surface of the electrolyte 110. Thus, the positive tab can couple the electrolyte 110 with the positive region 155 so that a portion of the lid 120 functions as a positive terminal. The negative region 185 can couple with a negative portion of the electrolyte 110, for example, through a negative tab or wirebond. For example, a negative tab can include a first end that is soldered or welded to the negative region 185 and a second end that couples with a top surface of the electrolyte 110. Thus, the negative tab can couple the electrolyte 110 with the negative region 185 so that a portion of the lid 120 functions as a negative terminal.

The method 800 can include coupling the lid 120 (ACT 820). For example, the lid 120 can couple with the first end 170 of the housing 105 using a gasket 115 to seal the battery cell 100. The gasket 115 can include a first gasket surface 140 and a second gasket surface 145. The gasket 115 can hold or positioned the lid 120 such that the lid 120 is spaced a predetermined distance from one or more surfaces (e.g., top surface) of the electrolyte 110. The second gasket surface 145 can be disposed between the lid 120 and one or more surfaces (e.g., top surface) of the electrolyte 110. For example, the lid 120 can be spaced a distance from a top surface of the electrolyte 110 corresponding to a thickness of the second gasket surface 145.

The method 800 can include crimping the first end 170 of the housing 105 (ACT 825). The first end 170 of the housing 105 can be crimped to form a crimped edge 180 that is disposed about the first gasket surface 140. The crimped edge 180 can be formed to couple the gasket 115 with the first end 170 of the housing 105 and position the second gasket surface 145 adjacent to or opposing at least a portion of the electrolyte 110. The second gasket surface 145 of the gasket 115 can be positioned such that it opposes or is disposed over a surface (e.g., first surface) of the electrolyte 110. The crimped edge 180 can be formed having a first crimped surface 220 and a second crimped surface 230. The first crimped surface 220 can form a portion of a top surface of the battery cell 100 and, for example, can include the pattern 225. The second crimped surface 220 can be disposed adjacent to the first gasket surface 140 and, for example, can be smooth, flat, or not include the pattern 225. The second crimped surface 230 of the crimped edge 180 can oppose or face the first gasket surface 140. For example, the second crimped surface 230 can contact the first gasket surface 140. The second crimped surface 230 can also be separated from the first gasket surface 140 by at least one intervening layer such as an insulative or protective layer of material. The direct contact or contact via intervening elements can form an air tight seal between at least part of the second crimped surface 230 and the first gasket surface 140.

One or more crimper holders 305 can be coupled with side surfaces of the housing 105 of the battery cell 100 to form the crimped edges 180. For example, a first crimper holder 305 can be coupled with or positioned in contact with a first side surface 310 of the housing 105. A second crimper holder 305 can be coupled with or positioned in contact with a second side surface 310 of the housing 105. The crimper holders 305 can be positioned such that they hold the battery cell 100 in place during a crimping process. A first crimper die 330 can be applied to straight edges 320 of the housing 105 to crimp or otherwise compress the straight edges 320 and form crimped edges 180. The first crimper die 330 can include one or more surfaces 335 having a flat, straight, or otherwise smooth surface. For example, a first surface 335 of the first crimper die 330 can include a smooth surface not having any deformations, divots, recess, or ridges. The first crimper die 330 can be formed having a recess region 340 and first and second application surfaces 345. The application surfaces 345 can be formed at ends or edges of the first surface 335 and the recess region 340 can be formed in a middle region of the first surface 335. The application surfaces 345 can extend beyond an edge of the recess region 340 such that the application surfaces 345 can contact straight edges 320 of the housing 105 during a crimping process. For example, the first surface 335 can be applied to the straight edges 320 of the housing 105 to crimp or otherwise compress the straight edges 320 and form crimped edges 180. The application surfaces 345 can contact the straight edges 320 and crimp the straight edges 320 and form crimped edges 180 while the recess region 340 is spaced a predetermined distance from a top surface of the lid 120 (e.g., the recess region 340 does not contact the lid 120). The crimped edge 180 can be formed having a length of 1 mm to 3 mm. For example, a length the crimped edge extends out over the first gasket surface 140 of the gasket 115 can be in a range from 1 mm to 3 mm.

The method 800 can include forming a pattern 225 (ACT 830). The pattern 225 can correspond to a predetermined pattern and can be formed on the first crimped surface 220 of the crimped edge 180 to bond or otherwise couple a wire with the pattern 225 that appears on or is part of the crimped edge 180. A second crimper die 430 can be applied to a surface (e.g., top surface) of the crimped edges 180 to pattern the respective surface of the crimped edges 180. A rotating mechanism or rotating device can be used to apply the second crimper die 430 to the surface of the crimped edges 180. For example, the second crimper die 430 can be rotated relative to the surface of the crimped edges 180 by the rotating mechanism or rotating device to form a pattern 540 on the surface of the crimped edges 180. The second crimper die 430 can include a first surface 435 having the pattern 540 formed thereon. The pattern 540 can include a series of ridges formed on the first surface 435 of the second crimper die 430. The dimensions (e.g., height) of the ridges can range from 200μ to 500μ in height with respect to the first surface 435 220 of the crimper die 430. The pattern 540 can include a series of divots or other deformations formed on the surface 220. The pattern 540 can include a hatched pattern. The pattern 540 formed on the first surface 435 of the second crimper die 430 can include other shapes, sizes and dimensions outside these described herein. A length of the first surface 435 of the first crimper die 430 can range from 1 mm to 10 mm.

The second crimper die 430 can be formed having a recess region 440 and first and second application surfaces 445. The application surfaces 445 can be formed at ends or edges of the first surface 435 and the recess region 440 can be formed in a middle region of the first surface 435. The application surfaces 445 can be formed having the pattern 540. The application surfaces can be formed to extend beyond an edge of the recess region 440 such that the application surfaces 445 can contact crimped edges 180 during a crimping process. For example, the application surfaces 445 of the first surface 435 can be applied to the top surface of the crimped edges 180 to form the pattern 225 or patterned surface 225. The pattern 225 of the crimped edges 180 can be the same as or correspond to the pattern 540 of the second crimper die 430. For example, one or more ridges, one or more divots or a hatched pattern can be formed on the first crimped surface 220 to form the predetermined pattern 225. The pattern 225 can increase a surface area of the crimped edge 180 for wire bonding. The pattern 225 can include forming one or more deformations on the first crimped surface 220 having one of more deformations. The deformations (e.g., ridges, divots) can be formed having a height that ranges from 200μ to 500μ with respect to the first crimped surface 220.

Figure 9:
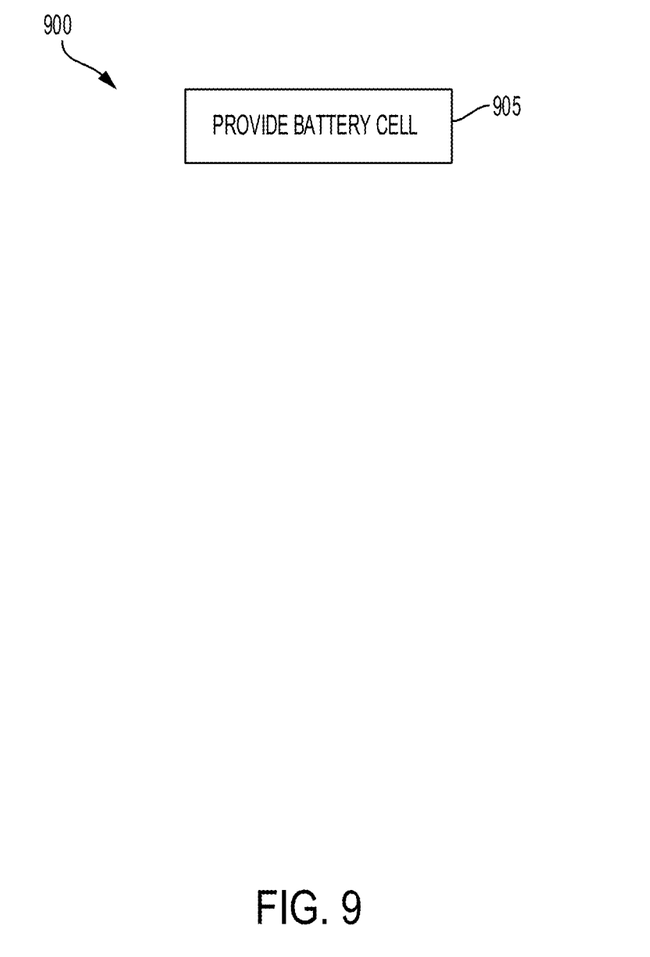
FIG. 9 is a flow diagram depicting an example method of providing battery cells for battery packs for electric vehicles.

FIG. 9 depicts a method 900. The method 900 can include providing a battery cell 100 (ACT 905). For example the battery cell 100 of a battery pack 605 can be provided to power at least one electric vehicle 705. The battery cell 100 can include a housing 105 having a first end 170 and a second end 175. The housing 105 can define an inner region 165. An electrolyte 110 can be disposed in the inner region 165 defined by the housing 105. The battery cell 100 can include a lid 120. A gasket 115 can couple the lid 120 with the first end 170 of the housing 105 to seal the battery cell 100. The gasket 115 can include a first gasket surface 140 and a second gasket surface 145. The first end 170 of the housing 105 can include a crimped edge 180 disposed about the first gasket surface 140 to couple the gasket 115 with the first end 170 of the housing 105 and position the second gasket surface 145 adjacent to the electrolyte 110. The crimped edge 180 can include a first crimped surface 220 having a predetermined pattern 225 for wire bonding and a second crimped surface 230 disposed adjacent to or opposing the first gasket surface 140.

While acts or operations may be depicted in the drawings or described in a particular order, such operations are not required to be performed in the particular order shown or described, or in sequential order, and all depicted or described operations are not required to be performed. Actions described herein can be performed in different orders.

Having now described some illustrative implementations, it is apparent that the foregoing is illustrative and not limiting, having been presented by way of example. Features that are described herein in the context of separate implementations can also be implemented in combination in a single embodiment or implementation. Features that are described in the context of a single implementation can also be implemented in multiple implementations separately or in various sub-combinations. References to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any act or element may include implementations where the act or element is based at least in part on any act or element.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. For example the voltage across terminals of battery cells can be greater than 5V. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

Systems and methods described herein may be embodied in other specific forms without departing from the characteristics thereof. For example, descriptions of positive and negative electrical characteristics may be reversed. For example, elements described as negative elements can instead be configured as positive elements and elements described as positive elements can instead by configured as negative elements. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled, adjacent, or proximate elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A battery cell of a battery pack to power electric vehicles, the battery cell comprising:
   a housing having a first end and a second end, the housing defining an inner region;
   an electrolyte disposed in the inner region defined by the housing;
   a lid;
   a gasket that couples the lid with the first end of the housing to seal the battery cell, the gasket having a first gasket surface and a second gasket surface;
   the first end of the housing having a crimped edge disposed about the first gasket surface to couple the gasket with the first end of the housing and position the second gasket surface adjacent to the electrolyte; and
   the crimped edge having a first crimped surface, the first crimped surface having a predetermined pattern to bond a wire with the first crimped surface, and the crimped edge having a second crimped surface that opposes the first gasket surface, the predetermined pattern having a plurality of deformations formed on the first crimped surface.

2. The battery cell of claim 1, comprising:
   the plurality of deformations including ridges or divots formed on the first crimped surface.

3. The battery cell of claim 1, comprising:
   the plurality of deformations form a hatched pattern on the first crimped surface.

4. The battery cell of claim 1, comprising:
   the the plurality of deformations having a height that ranges from 200μ to 500μ with respect to the first crimped surface.

5. The battery cell of claim 1, comprising:
   the crimped edge having a length of 1 mm to 2 mm.

6. The battery cell of claim 1, comprising:
   the lid spaced from the electrolyte by a distance corresponding to a thickness of the gasket.

7. The battery cell of claim 1, comprising:
   multiple electrolytes disposed in the inner region defined by the housing, and the second gasket surface disposed adjacent to each of the multiple electrolytes.

8. The battery cell of claim 1, comprising:
   the lid having a positive region, a negative region and an insulating region disposed between the positive region and the negative region, and the crimped edge disposed about a portion of the negative region.

9. The battery cell of claim 1, comprising:
the gasket including:
a first gasket coupled with a first lid edge of the lid and proximate to the electrolyte; and
a second gasket coupled with a second lid edge of the lid and proximate to the electrolyte, and
the crimped edge including:
a first crimped edge disposed about the first gasket, the first crimped edge having the predetermined pattern; and
a second crimped edge disposed about the second gasket, the second crimped edge having the predetermined pattern.

10. The battery cell of claim 1, comprising:
a first crimper holder coupled with a first side surface of the housing and a second crimper holder coupled with a second side surface of the housing.

11. The battery cell of claim 1, comprising:
a first crimp die having a first recess region and an application surface; and
a second crimp die having a second recess region and an outer region, the outer region including the patterned surface.

12. The battery cell of claim 1, comprising:
the battery cell disposed in a battery module having multiple battery cells.

13. The battery cell of claim 1, comprising:
the battery cell disposed in a battery module and the battery module disposed in an electric vehicle.

14. A method of providing battery cell of a battery pack to power electric vehicles, comprising:
providing a housing having a first end and a second end, the housing defining an inner region;
disposing an electrolyte in the inner region defined by the housing;
providing a lid;
coupling the lid with the first end of the housing using a gasket to seal the battery cell, the gasket having a first gasket surface and a second gasket surface;
crimping the first end of the housing to form a crimped edge that is disposed about the first gasket surface to couple the gasket with the first end of the housing and position the second gasket surface adjacent to the electrolyte, the crimped edge having a first crimped surface and a second crimped surface that opposes the first gasket surface; and
forming a predetermined pattern on the first crimped surface to bond a wire with the first crimped surface, the predetermined pattern having a plurality of deformations formed on the first crimped surface.

15. The method of claim 14, comprising:
forming the plurality of deformations to include ridges, divots or a hatched pattern on the first crimped surface.

16. The method of claim 14, comprising:
forming the the plurality of deformations having a height that ranges from 200μ to 500μ with respect to the first crimped surface.

17. The method of claim 14, comprising:
spacing the lid a predetermined distance from the electrolyte, the predetermined distance corresponding to a thickness of the gasket.

18. The method of claim 14, comprising:
disposing multiple electrolytes disposed in the inner region defined by the housing, and disposing the second gasket surface adjacent to each of the multiple electrolytes.

19. The method of claim 14, comprising:
forming a positive region on the lid;
forming a negative region on the lid; and
forming an insulating region between the positive region and the negative region on the lid.

20. An electric vehicle, comprising:
a battery pack having a battery cell, the battery cell comprising:
a housing having a first end and a second end, the housing defining an inner region;
multiple electrolytes disposed in the inner region defined by the housing;
a lid;
a gasket that couples the lid with the first end of the housing to seal the battery cell, the gasket having a first gasket surface and a second gasket surface, the second gasket surface disposed adjacent to each of the multiple electrolytes;
the first end of the housing having a crimped edge disposed about the first gasket surface to couple the gasket with the first end of the housing and position the second gasket surface adjacent to the multiple electrolytes; and
the crimped edge having a first crimped surface, the first crimped surface having a predetermined pattern to bond a wire with the first crimped surface, and the crimped edge having a second crimped surface that opposes the first gasket surface.

* * * * *